US008295994B2

(12) United States Patent
Hwang et al.

(10) Patent No.: US 8,295,994 B2
(45) Date of Patent: Oct. 23, 2012

(54) VEHICLE CONTROL METHOD AND APPARATUS OF TELEMATICS TERMINAL

(75) Inventors: Jung-Hyun Hwang, Seoul (KR); Jung-Hak Ryu, Seoul (KR); Jin-Seok Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 427 days.

(21) Appl. No.: 12/567,363

(22) Filed: Sep. 25, 2009

(65) Prior Publication Data

US 2010/0106345 A1 Apr. 29, 2010

(30) Foreign Application Priority Data

Oct. 28, 2008 (KR) ........................ 10-2008-0106121

(51) Int. Cl.
*G05D 1/00* (2006.01)

(52) U.S. Cl. ........................................ 701/2; 455/426.1

(58) Field of Classification Search .................. 701/1, 2; 340/521; 455/426.1

See application file for complete search history.

(56) References Cited

U.S. PATENT DOCUMENTS

| | | | | |
|---|---|---|---|---|
| 36,437 | A * | 9/1862 | Hanson et al. | 75/388 |
| 7,027,912 | B1 * | 4/2006 | Metzger | 701/112 |
| 7,081,813 | B2 * | 7/2006 | Winick et al. | 340/521 |
| 7,504,931 | B2 * | 3/2009 | Nguyen | 340/426.36 |
| 2005/0128068 | A1 * | 6/2005 | Winick et al. | 340/517 |
| 2006/0271246 | A1 * | 11/2006 | Bell et al. | 701/1 |
| 2008/0287074 | A1 * | 11/2008 | Grunhold | 455/90.2 |
| 2009/0258642 | A1 * | 10/2009 | Golenski | 455/426.1 |
| 2010/0075655 | A1 * | 3/2010 | Howarter et al. | 455/420 |

* cited by examiner

*Primary Examiner* — Behrang Badii
*Assistant Examiner* — Shardul Patel
(74) *Attorney, Agent, or Firm* — Birch, Stewart, Kolasch & Birch, LLP

(57) ABSTRACT

A vehicle, vehicle control apparatus and method of a telematics terminal are disclosed to allow a user to quickly determine and cope with a vehicle event. The vehicle control method includes: when an event informing about a vehicle event occurs, transmitting notification information corresponding to the event and/or control information previously determined for processing the event to a mobile communication terminal via a wireless communication network; and when user request information with respect to the control information is received from the mobile communication terminal, controlling a vehicle according to the received user request information.

21 Claims, 12 Drawing Sheets

VEHICLE CONTROL METHOD AND APPARATUS OF TELEMATICS TERMINAL

CROSS REFERENCE TO RELATED APPLICATIONS

The present application is related to, and claims priority to, Korean patent application 10-2008-0106121, filed on Oct. 28, 2008, the entire contents of which is incorporated herein by reference.

BACKGROUND OF THE INVENTION

1. Field of the Invention

The present invention relates to a vehicle control method and apparatus of a telematics terminal.

2. Description of the Related Art

In general, a vehicle navigation device is a device for generating road guidance information based on a GPS (Global Positioning System) signal and map information and providing the road guidance information to a user.

FIG. 1 is a schematic block diagram of a related art vehicle navigation system.

As shown in FIG. 1, the related art vehicle navigation system includes: an information providing center 3 providing traffic information; and a vehicle navigation device 4 mounted in a vehicle, receiving traffic information via a wireless communication network, and providing a road guidance service based on a GPS signal and the traffic information received via an artificial satellite 1. However, the conventional navigation system has limited capability regarding the processing of event or control information.

SUMMARY OF THE INVENTION

Therefore, in order to address the above matters, the various features described herein have been conceived.

According to an aspect of the present invention, there is provided a vehicle control method including: when an event informing about a vehicle event occurs, transmitting notification information corresponding to the event and/or control information previously determined for responding to the event to a mobile communication terminal via a wireless communication network; and when user request information with respect to the control information is received from the mobile communication terminal, controlling a vehicle according to the received user request information.

According to another aspect of the present invention, there is provided a vehicle control method including: receiving information about an internal temperature of a vehicle; and transmitting a notification signal corresponding to the internal temperature of the vehicle to the mobile communication terminal, if the internal temperature corresponding to the internal temperature information is higher than a reference temperature.

In an exemplary vehicle control method, a plurality of code numbers for controlling a door and/or sunroof of the vehicle are included in order to lower the internal temperature of the vehicle.

In an exemplary vehicle control method, when a particular code number, among the plurality of code numbers, is received as user request information, the door and/or sunroof of the vehicle may be controlled based on the particular code number.

The exemplary vehicle control method may include: determining whether or not the door and/or sunroof of the vehicle is open when a rainwater or snow detection signal is received;

and transmitting a notification signal corresponding to the rainwater or snow detection signal to the mobile communication terminal if the door and/or sunroof of the vehicle is open.

In an exemplary vehicle control method, a plurality of code numbers for controlling the door and/or sunroof of the vehicle to block rainwater or snow may be included.

The exemplary vehicle control method may further include: when a particular code number, among the plurality of code numbers, is received as the user request information, shutting the door and/or sunroof of the vehicle based on the particular code number.

According to another aspect of the present invention, there is provided a vehicle control method including: detecting a remaining battery capacity of a vehicle; and if the remaining battery capacity of the vehicle is lower than a reference value, transmitting a notification signal corresponding to the remaining battery capacity.

In an exemplary vehicle control method, a plurality of code numbers for controlling starting of the vehicle to charge the battery of the vehicle are included.

In an exemplary vehicle control method, when a particular code number, among the plurality of code numbers, is received as user request information, starting the vehicle for a pre-set time period based on the particular code number.

According to another aspect of the present invention, there is provided a vehicle and a vehicle control apparatus including: a controller configured to read notification information corresponding to an event informing about a vehicle event and control information previously determined to respond to the event, if the event occurs; and a communication unit configured to transmit the notification information and the control information to a mobile communication terminal via a wireless communication network, wherein when user request information with respect to the control information is received from the mobile communication terminal, the controller controls a vehicle according to the received user request information.

The exemplary vehicle control apparatus may include a plurality of code numbers for controlling a door and/or sunroof of the vehicle in order to lower an internal temperature of the vehicle.

In an exemplary vehicle control apparatus, when a particular code number, among the plurality of code numbers, is received as user request information, the door and/or sunroof of the vehicle may be controlled based on the particular code number.

The exemplary vehicle control apparatus determines whether or not the door and/or sunroof of the vehicle is open when a rainwater or snow detection signal is received, and transmits a notification signal corresponding to the rainwater or snow detection signal to the mobile communication terminal if the door and/or sunroof of the vehicle is open.

In an exemplary vehicle control apparatus, a plurality of code numbers for controlling the door and/or sunroof of the vehicle to block rainwater or snow may be included.

In an exemplary vehicle control apparatus, when a particular code number, among the plurality of code numbers, is received as the user request information, the door and/or sunroof of the vehicle are shut based on the particular code number.

According to another aspect of the present invention, there is provided a vehicle control apparatus that detects a remaining battery capacity of a vehicle, and transmits a notification signal corresponding to the remaining battery capacity to a mobile communication terminal if the remaining battery capacity of the vehicle is lower than a reference value.

In an exemplary vehicle control apparatus, a plurality of code numbers for controlling starting of the vehicle are included to charge the battery of the vehicle.

In an exemplary vehicle control apparatus, when a particular code number, among the plurality of code numbers, is received as user request information, the vehicle is started for a pre-set time period based on the particular code number.

The foregoing and other objects, features, aspects and advantages of the present invention will become more apparent from the following detailed description of the present invention when taken in conjunction with the accompanying drawings.

DETAILED DESCRIPTION OF THE INVENTION

A vehicle control method and apparatus by a telematics terminal capable of allowing a user to quickly determine and cope with a vehicle event according to exemplary embodiments of the present invention will now be described with reference to FIGS. 2 to 12.

Figure 1:
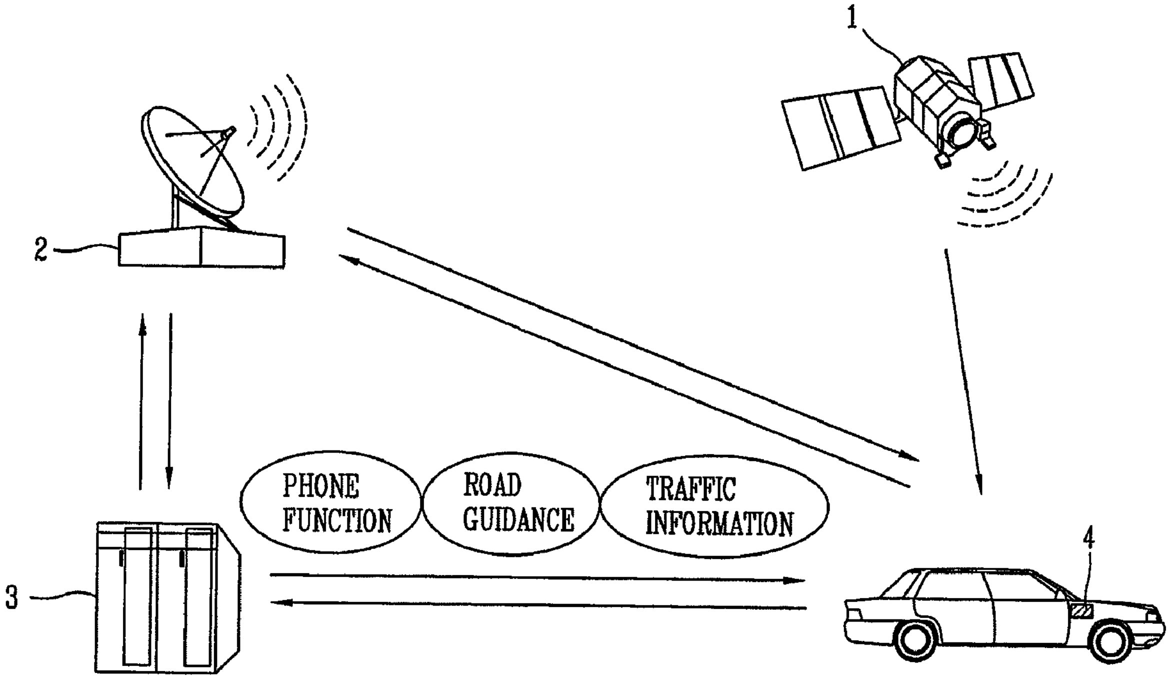
FIG. 1 RELATED ART
FIG. 1 is a schematic block diagram showing a vehicle navigation system according to the related art.
Figure 2:
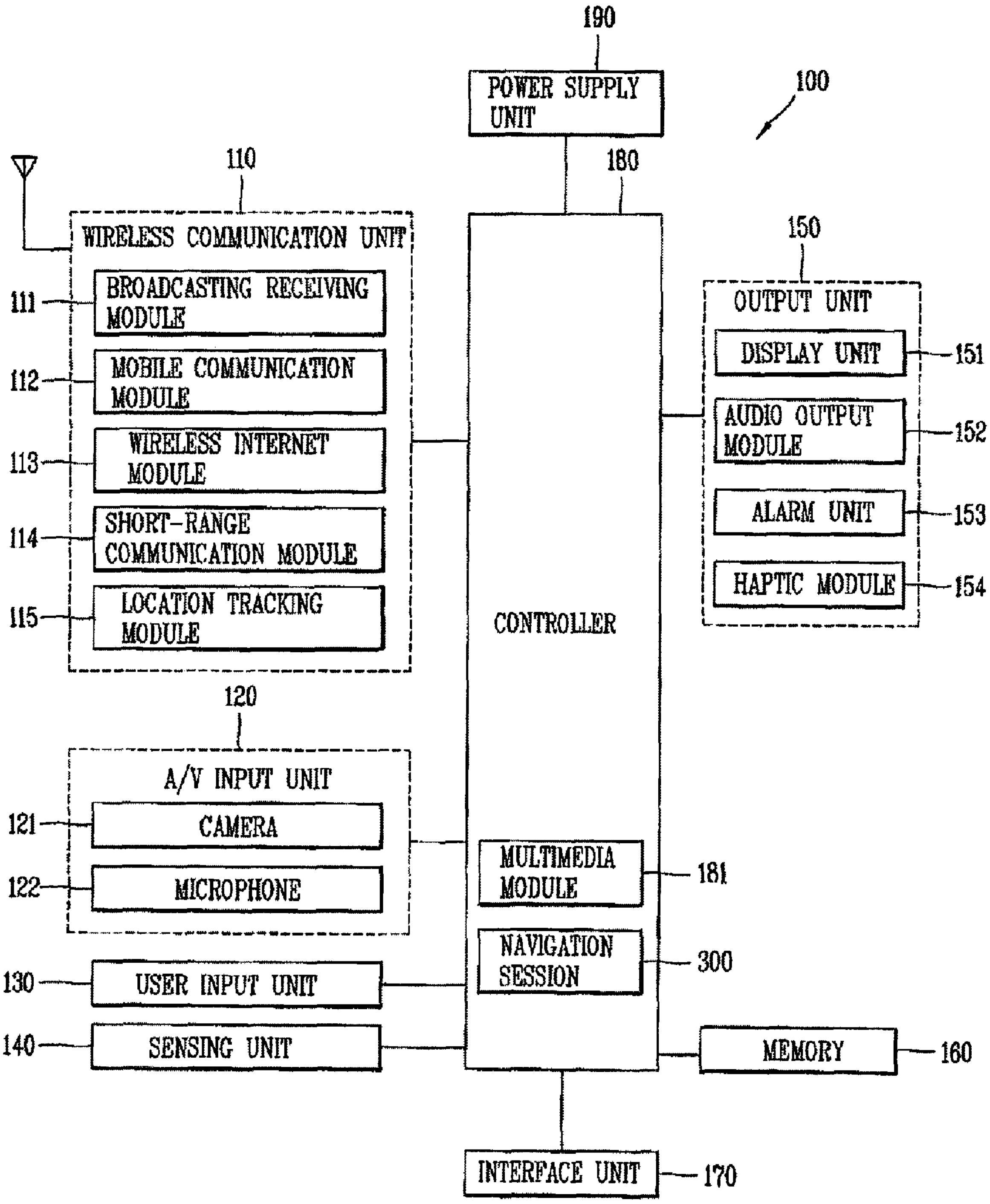
FIG. 2 is a schematic block diagram showing a mobile communication terminal employing a vehicle control apparatus according to an embodiment of the present invention.

FIG. 2 is a schematic block diagram showing a communication terminal 100 employing a vehicle control apparatus according to an exemplary embodiment of the present invention. The communication terminal 100 may be installed in a vehicle or building or may be a mobile communication terminal. For convenience, the following paragraphs refer to communication terminal 100 as mobile communication terminal 100. The mobile communication terminal 100 may be implemented in various forms. For example, the mobile communication terminal 100 may include mobile phones, smart phones, notebook computers, digital broadcast receivers, PDAs (Personal Digital Assistants), PMPs (Portable Multimedia Player), navigation devices, and the like.

As shown in FIG. 2, the mobile communication terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. It should be understood that implementing all of the illustrated components of the mobile communication terminal 100 shown in FIG. 2 is not a requirement. That is, greater or fewer components may alternatively be implemented.

The wireless communication unit 110 may include one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location tracking module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

Optionally, the mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal.

The short-range communication module 114 is a module for supporting short range communications. Some examples of short-range communication technology includes Bluetooth™, Radio Frequency IDentification (RFID), Infrared Data Association (IrDA), Ultra-WideBand (UWB), ZigBee™, and the like.

The location tracking module 115 is a module for checking or acquiring a location (or position) of the mobile communication terminal. For example, the location tracking module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As a part of the location tracking module 115, a Wi-Fi positioning system and/or hybrid positioning system may be applied.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means.

The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile communication terminal 100 may include two or more display units (or other display means) according to its particular desired embodiment. For example, the mobile communication terminal may include both an external display unit (not shown) and an internal display unit (not shown).

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile communication terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile communication terminal 100. Typical events may include call reception, message reception, key signal inputs, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile communication terminal 100. The haptic module 154 may be provided at a position which is frequently brought into contact with the user in the vehicle. For example, the haptic module 154 may be provided at a steering wheel, a speed changing gear lever, a seat, and the like.

The memory 160 (or other storage means) may store software programs or the like used for the processing and controlling operations performed by the controller 180, or may temporarily store data (e.g., a phonebook, messages, still images, video, etc.) that have been outputted or which are to be outputted.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile communication terminal 100 may cooperate with a network storage device that performs the storage function of the memory 160 over a network connection.

The controller 180 (such as a microprocessor or the like) typically controls the general operations of the mobile communication terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The power supply unit 190 receives external power (via a power cable connection) or internal power (via a battery of the mobile communication terminal) and supplies appropriate power required for operating respective elements and components under the control of the controller 180.

Various functions applied to the mobile communication terminal 100 may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

A navigation session 300 applied to the mobile communication terminal 100 generates road guidance information and provides the generated road guidance information to the user.

The configuration of a telematics terminal 200 employing the vehicle control apparatus according to an exemplary embodiment of the present invention will now be described with reference to FIG. 3.

Figure 3:
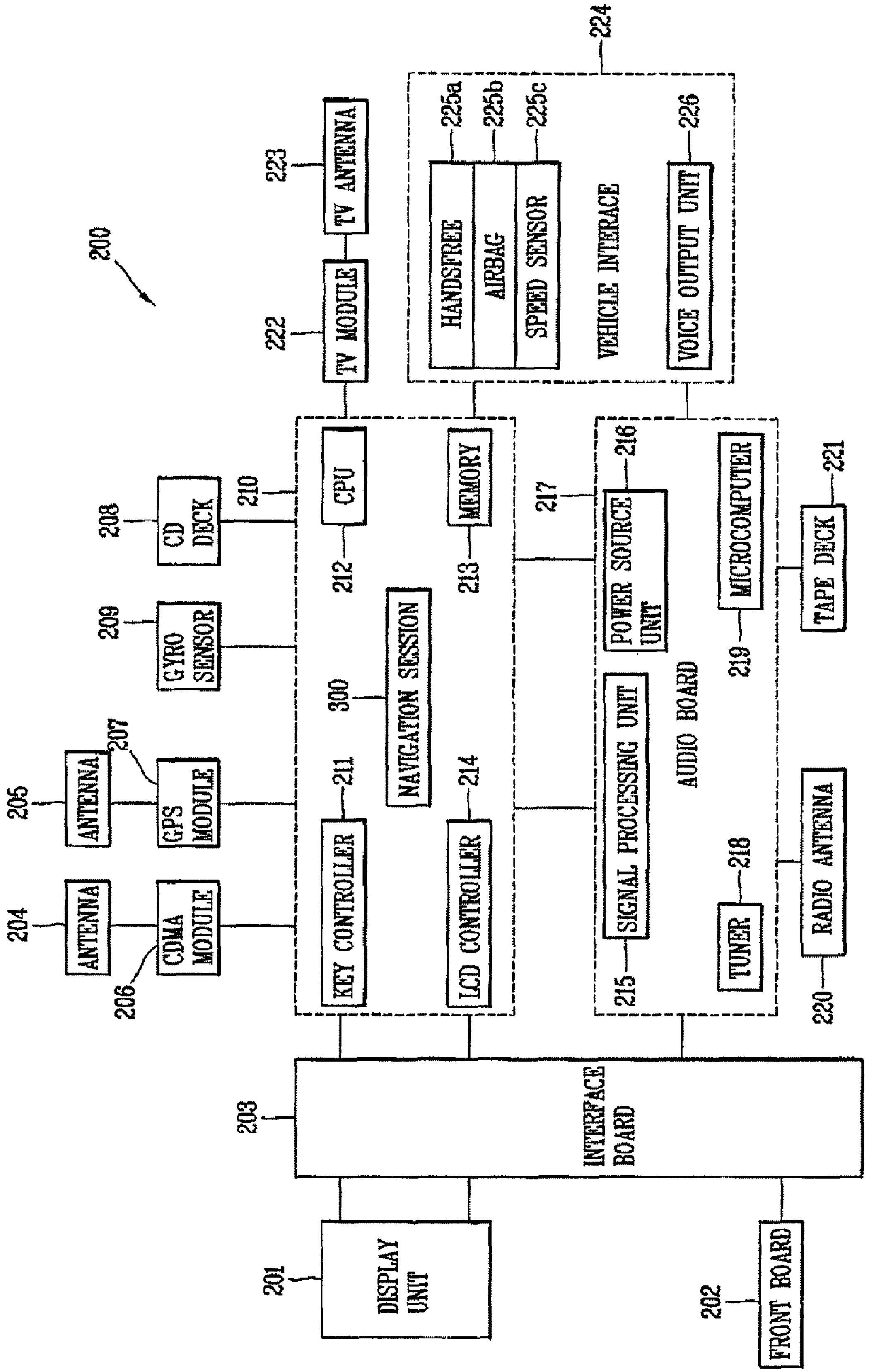
FIG. 3 is a schematic block diagram showing a telematics terminal employing the vehicle navigation apparatus according to the present invention.

FIG. 3 is a schematic block diagram showing the telematics terminal 200 employing the vehicle control apparatus according to the present invention.

As shown in FIG. 3, the telematics terminal 200 according to the exemplary embodiment of the present invention includes a main board 210 including a CPU (Central Processing Unit) 212 for controlling the telematics terminal 200, a memory 213 for storing various information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, a mobile communication terminal having a unique device number as assigned and installed in the vehicle, a GPS module 207 for guiding a location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA or other communication module 206 and the GPS module 207 receive signals via antennas 204 and 205.

An optional TV module 222 is connected with the main board 210 and receives a TV signal via a TV antenna 223. An LCD (display unit) 201 under the control of the LCD controller 214 and a front board 202 under the control of the key controller 211 are connected to the main board 210 via an interface board 203. The LCD 201 displays various video signals and character signals, and the front board 202 includes buttons for various key signal inputs and provides a key signal corresponding to a button selected by the user to the main board 210. The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 also includes a radio antenna 220 for receiving a radio signal and a tape deck 221 for reproduce an audio tape. The audio board 217 may further include an amplifier (voice output unit) 226 for outputting a voice signal processed by the audio board 217.

The amplifier 226 is connected to a vehicle interface 224. Namely, the audio board 217 and the main board 210 are connected to the vehicle interface 224. A handsfree **225*a* for inputting a voice signal, an airbag 225*b* configured for the security of a passenger, a speed sensor 225*c* for detecting the speed of the vehicle, or the like, may be connected to the vehicle interface 224**.

The speed sensor **225*c* calculates a vehicle speed and provides the calculated vehicle speed information to the CPU 212**.

The navigation session 300 applied to the telematics terminal 200 generates road guidance information and provides the generated road guidance information to the user. Here, the function of the navigation session 300 according to exemplary embodiments of the present invention may be performed by the CPU (controller) 212 of the telematics terminal 200.

A vehicle navigation apparatus applied to the telematics terminal 200 will now be described with reference to FIG. 4.

Figure 4:
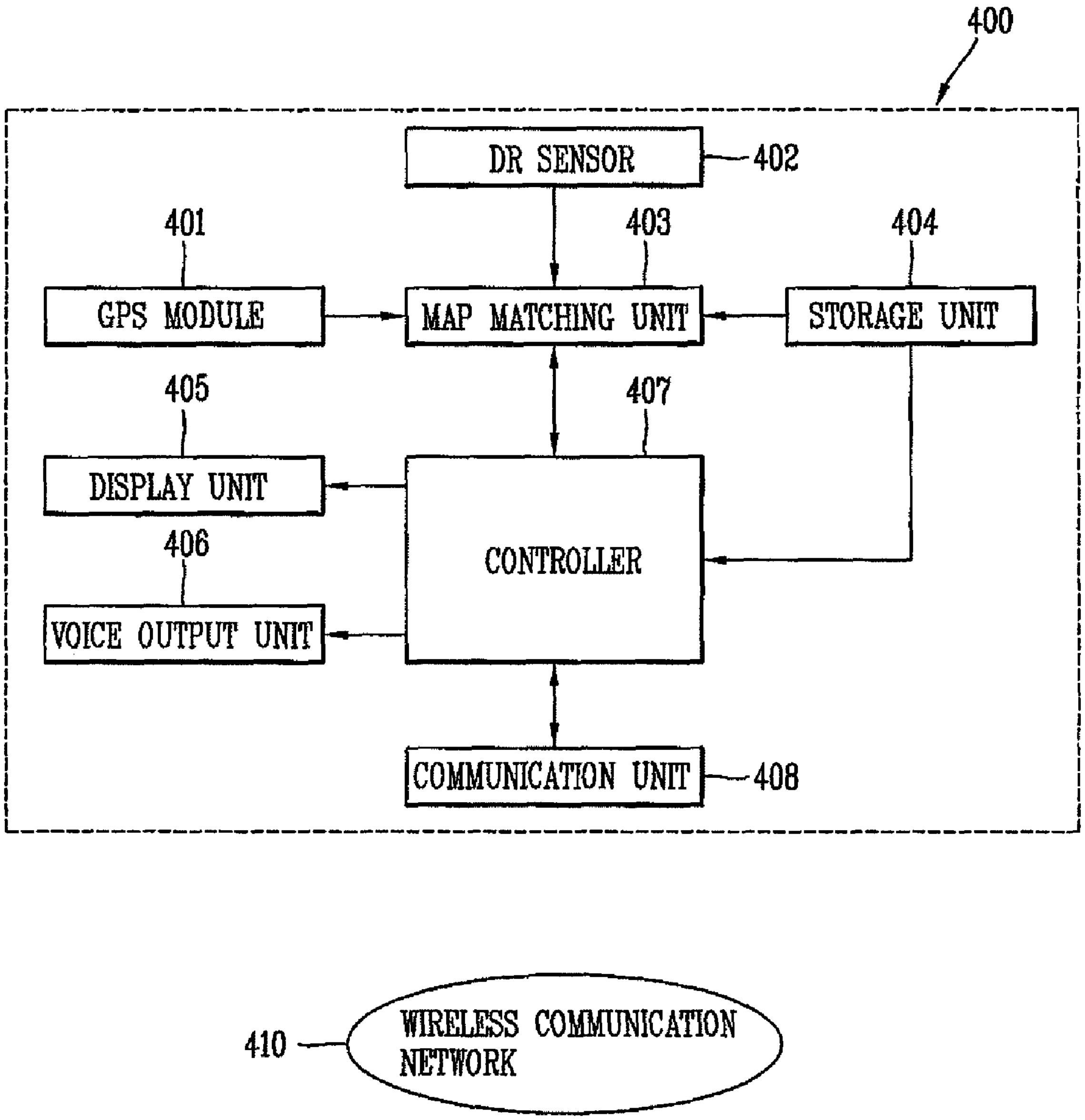
FIG. 4 is a schematic block diagram showing the configuration of a vehicle navigation apparatus employed for a telematics terminal.

FIG. 4 is a schematic block diagram showing the configuration of the vehicle navigation apparatus according to an exemplary embodiment of the present invention.

As shown in FIG. 4, a vehicle navigation apparatus 400 according to an exemplary embodiment of the present invention includes a GPS receiver (GPS module) 401 for receiving a GPS signal from a satellite and generating first vehicle location data of the navigation apparatus (regarded as the same location as the telematics terminal 200) based on the received GPS signal; a DR (Dead-Reckoning) sensor 402 for generating second vehicle location data based on a travel direction and the speed of a vehicle; a storage unit 404 for storing map data; a map matching unit 403 for generating a vehicle estimated location based on the first and second vehicle location data, matching the generated vehicle estimated location and a line (map matching link or a map matching road) in map data stored in the storage unit 404, and outputting the matched map information (map matching results); a communication unit 408 for receiving real time traffic information from an information providing center via a wireless communication network 400; a controller 407 for generating road guidance information based on the matched map information (map matching results); a display unit 405 for displaying a road guidance map included in the road guidance information; a voice output unit 406 for outputting road guidance voice information (road guidance voice message) included in the road guidance.

Here, the GPS receiver 401 may be the GPS module 207 of the telematics terminal, the storage unit 404 may be the memory 213 of the telematics terminal, the display unit 405 may be the LCD 201 of the telematics terminal, and the voice output unit 406 may be the amplifier 226 of the telematics terminal. In addition, the functions of the map matching unit 403 and the controller 407 may be performed by the CPU 212 of the telematics terminal.

The technique of generating the vehicle estimated location based on the first vehicle location data generated by the GPS receiver 401 and the second vehicle location data generated by the DR sensor 402 and outputting guidance information is a known art, so its detailed description will be omitted.

The vehicle control apparatus applied to the telematics terminal 200, here identified as telematics terminal 500, according to exemplary embodiments of the present invention will now be described in detail with reference to FIG. 5.

Figure 5:
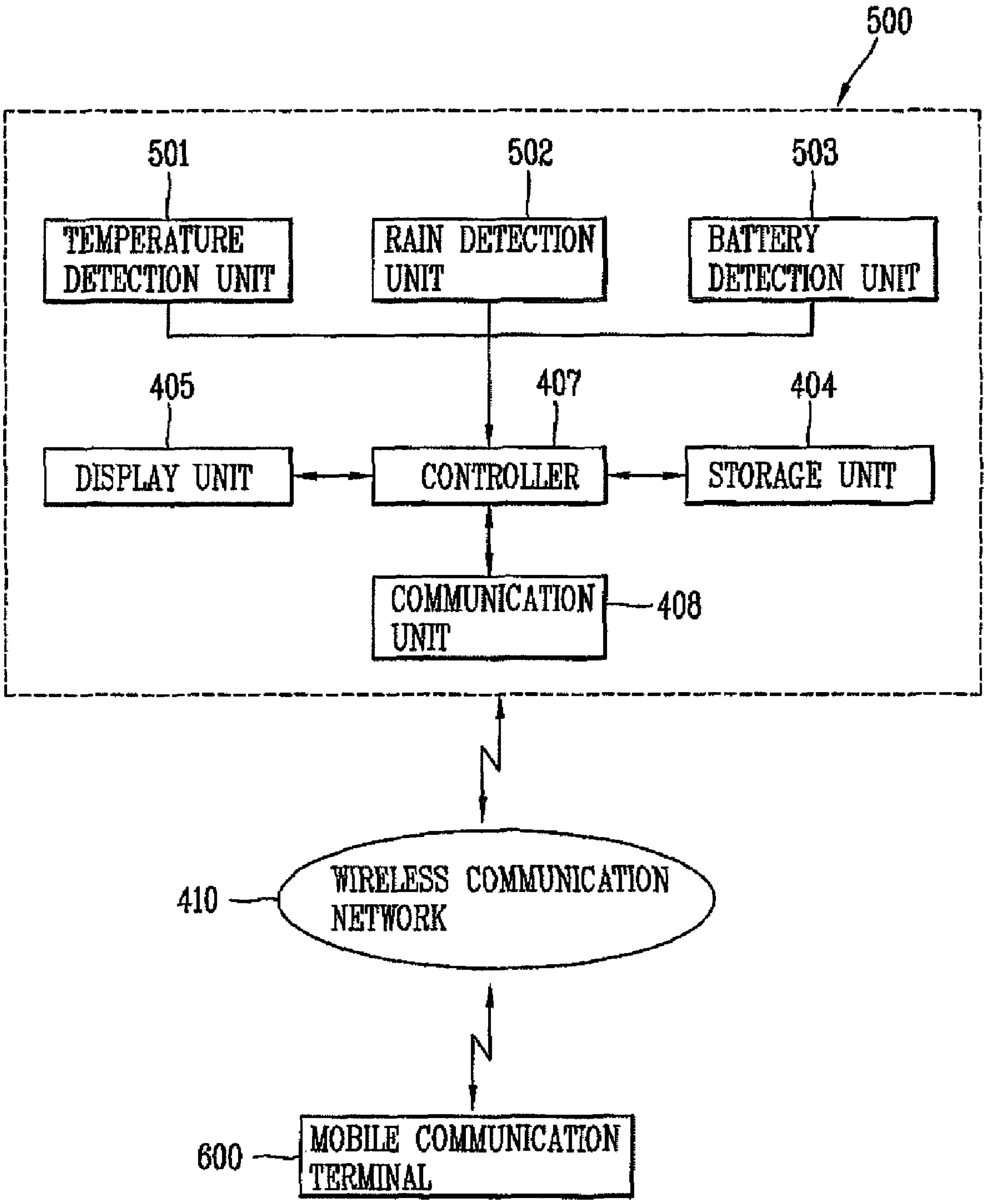
FIG. 5 is a vehicle control apparatus according to an exemplary embodiment of the present invention.

FIG. 5 is a vehicle control apparatus according to an exemplary embodiment of the present invention.

As shown in FIG. 5, the vehicle control apparatus according to an exemplary embodiment of the present invention includes the storage unit 404 for storing notification information corresponding to a plurality of events and control information previously determined to process the plurality of events; the controller 407 for reading notification information corresponding to events which have occurred to inform about a vehicle event and control information previously determined to respond to the events as occurred, from the storage unit 404; and the communication unit 408 for transmitting the notification information and the control information via the wireless communication network 410. Here, when user request information with respect to the control information is received from the mobile communication terminal 100 via the wireless communication network 410, the controller 407 controls a vehicle according to the received user request information. In the meantime, if user request information with respect to the control information is not received for a pre-set time period (e.g., five minutes), the controller 407 controls the vehicle according to the previously determined control information.

When a vehicle event occurs, the controller 407 may display notification information, corresponding to the event and control information previously determined to respond to the event, on the display unit 405. In this case, when the control information displayed on the display unit 405 is selected by the user, the controller 407 may control the vehicle according to the selected control information.

The types of events that may be considered environmental events, such as a high/low vehicle cabin temperature event, a high vehicle moisture event, and a low vehicle battery event. (Other event types are also possible.) Accordingly, a temperature detection unit 501, a rain detector 502, and a battery detection unit 503 employed for the vehicle control apparatus 500 are units for determining whether or not the event occurs, and the controller 407 determines whether or not the event occurs based on a detection signal outputted from the temperature detection unit 501, the rain detector 502, and the battery detection unit 503. Here, in order to determine whether or not the vehicle event has occurred, various other units than the temperature detection unit 501, the rain detector 502, and the battery detection unit 503 may be added to the vehicle control apparatus of the telematics apparatus. Telematics terminal 500 can communicate with the mobile communication terminal 100 (here shown as mobile communication terminal 600.)

A vehicle control method according to a first exemplary embodiment of the present invention will now be described with reference to FIGS. 5 and 6.

Figure 6:
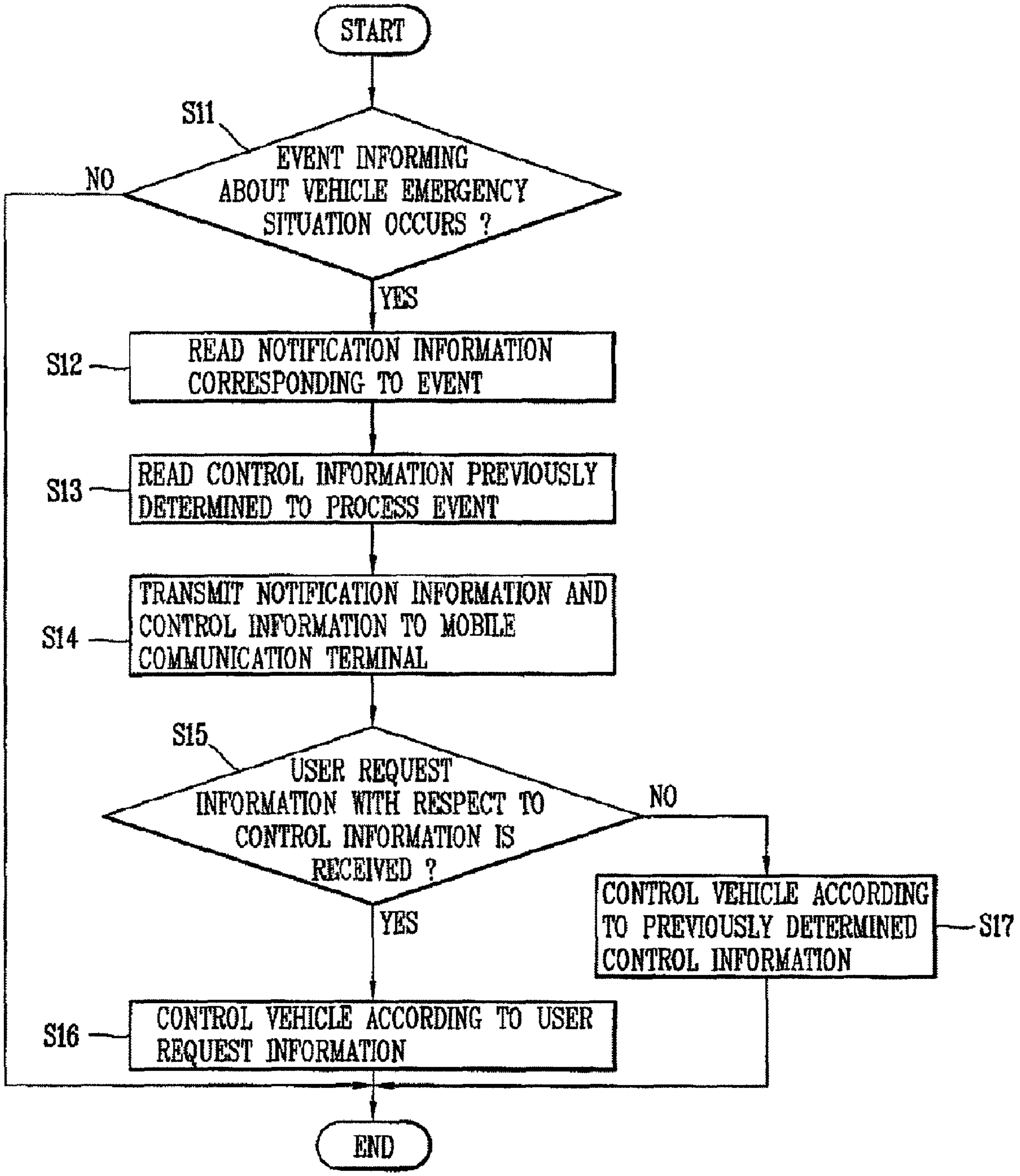
FIG. 6 is a flow chart illustrating the process of a vehicle control method according to a first exemplary embodiment of the present invention.

FIG. 6 is a flow chart illustrating the process of a vehicle control method according to a first exemplary embodiment of the present invention.

Prior to the process starting, the storage unit 404 stores notification information/criteria corresponding to a plurality of events and control information previously determined to be used to process the plurality of events.

When a vehicle event icon is selected, the controller 407 determines whether or not the vehicle event has occurred (S11). For example, after a driver parked his vehicle at a particular place and has moved to his home or to a particular area, when the user selects the vehicle event icon of the telematics terminal, the controller 407 determines whether or not a vehicle event has occurred in a state that the vehicle is in an OFF state. If the state that the vehicle is in an OFF state, the controller 407 may be supplied with power from a battery of the vehicle or power from an internal or external battery.

When a vehicle event occurs, the controller 407 reads, from the storage unit 404, notification information corresponding to the event and control information previously determined to be used to respond to the event (S12 and S13).

The controller 407 transmits the read notification information and control information to the mobile communication terminal 100 via the wireless communication network 410 (S14).

Thereafter, the controller 407 determines whether or not user request information with respect to the control information has been received from the mobile communication terminal 100 via the wireless communication network 410 (S15).

If user request information with respect to the control information has been received from the mobile communication terminal 100 via the wireless communication network 410, the controller 407 controls the vehicle according to the received user request information (S16). In the meantime, if user request information with respect to the notification information is not received within a pre-set time period (e.g., five minutes), the controller 407 controls the vehicle according to the previously determined control information (S17).

Here, when the user request information with respect to the control information is received from the mobile communication terminal 100 via a short-range wireless communication network such as Bluetooth™, the controller 407 controls the vehicle according to the received user request information, or when the user request information with respect to the control information is received from the mobile communication terminal 100 via the information providing center, the controller controls the vehicle according to the received user request information.

When a vehicle event occurs, the controller 407 may display notification information, corresponding to the event and control information previously determined to respond to the event, on the display unit 405. In this case, if the control information displayed on the display unit 405 is selected by the user, the controller 407 may control the vehicle according to the selected control information.

A vehicle control method according to a second exemplary embodiment of the present invention will now be described with reference to FIGS. 5, 7 and 8.

Figure 7:
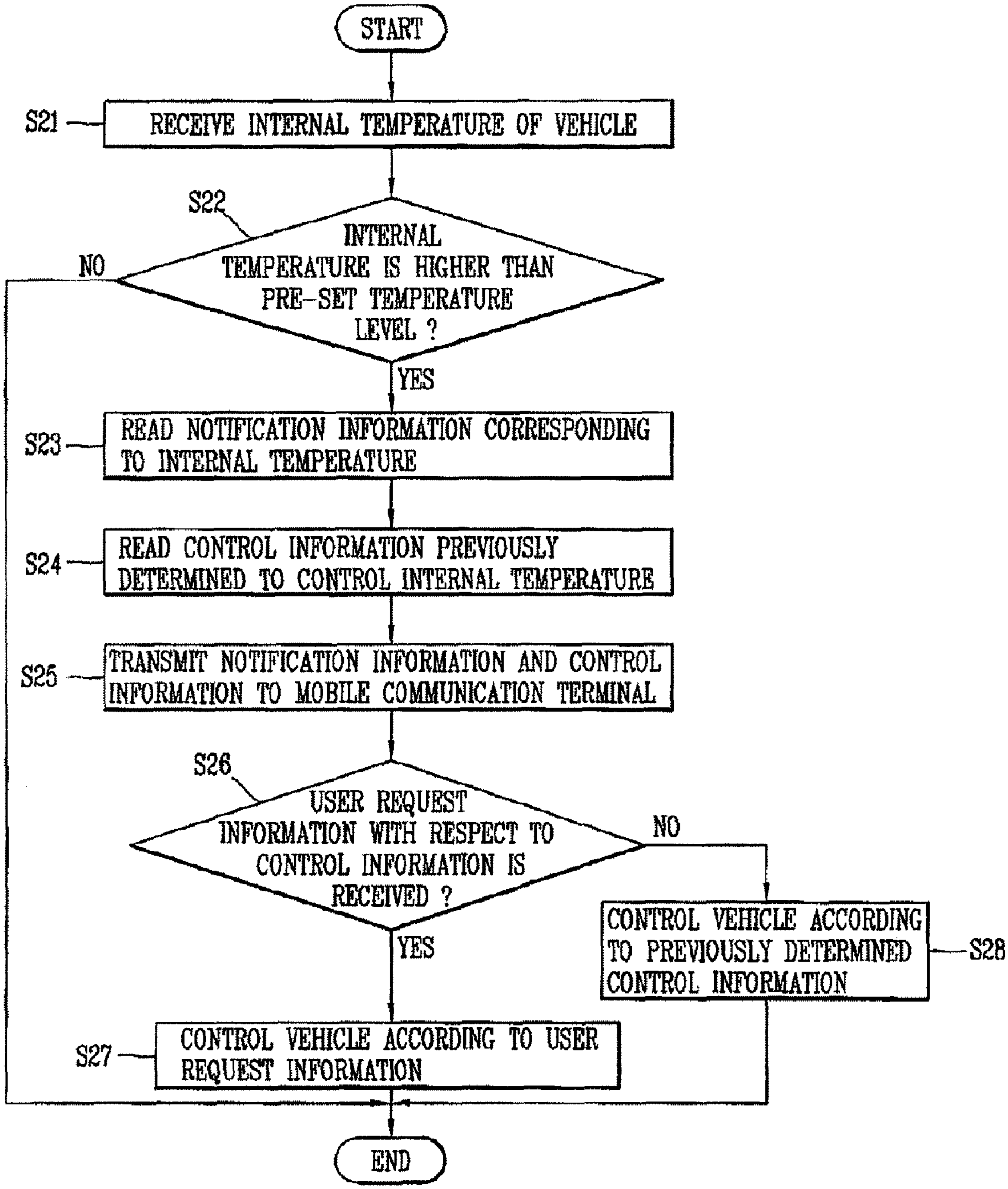
FIG. 7 is a flow chart illustrating the process of a vehicle control method according to a second exemplary embodiment of the present invention.

FIG. 7 is a flow chart illustrating the process of a vehicle control method according to a second exemplary embodiment of the present invention.

First, when the vehicle event icon of the telematics terminal is selected, the controller 407 receives information about an internal temperature of the vehicle from the temperature detection unit 501 mounted inside the vehicle (S21).

The controller 407 determines whether or not the internal temperature of the vehicle received from the temperature detection unit 501 mounted inside the vehicle is higher than a pre-set reference temperature level (e.g., 40 degrees Celsius) (S22). For example, if the vehicle is left for a long time in a state that the door and/or sunroof of the vehicle is shut in the height of summer (i.e., in an OFF state), the internal temperature of the vehicle goes up. This increase in heat may be dangerous for passengers or animals inadvertently left in the vehicle, or dangerous for products (e.g., flammables or food products) left in the vehicle. Thus, there is a need for lowering the internal temperature of the vehicle by controlling the door and/or the sunroof of the vehicle based on the internal temperature of the vehicle.

If the internal temperature of the vehicle received from the temperature detection unit 501 is higher than the pre-set reference temperature level (e.g., 40 degrees Celsius), the controller 407 may read notification information (e.g., text information of "Internal temperature of vehicle is high") corresponding to the internal temperature and control information (e.g., "Want to open door/sunroof of vehicle?") previously determined to lower the internal temperature, from the storage unit 404 (S23 and S24).

The controller 407 outputs the read notification information and the control information to the communication unit 408.

The communication unit 408 transmits the read notification information and control information to the mobile communication terminal 100 via the wireless communication network 410 (S25). Here, the communication unit 408 may form a wireless communication network with the mobile communication terminal 100 via the short-range wireless communication network such as Bluetooth™ and transmit the read notification information and the control information to the mobile communication terminal 100 therethrough, or may transmit the read notification information and the control information to the mobile communication terminal 100 via the information providing center.

Figure 8:
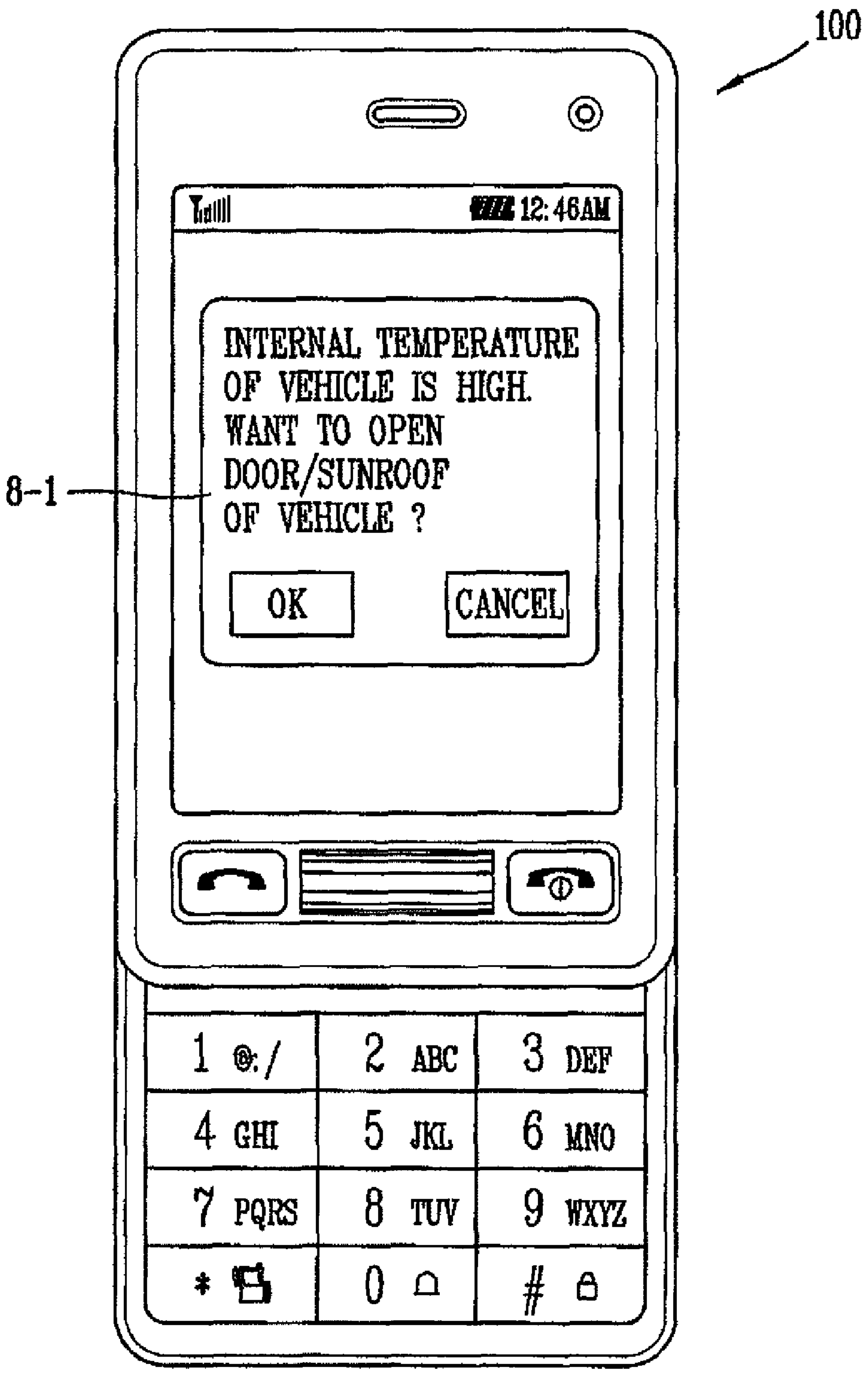
FIG. 8 illustrates notification information and control information displayed on a screen of a mobile communication terminal according to the second exemplary embodiment of the present invention.

FIG. 8 illustrates notification information and control information displayed on a screen of a mobile communication terminal according to the second exemplary embodiment of the present invention.

As shown in FIG. 8, the mobile communication terminal 100 displays the notification information (e.g., text information of "Internal temperature of vehicle is high") and the control information (e.g., "Want to open door/sunroof of vehicle?") (8-1) received from the vehicle control apparatus on its screen. Here, the control information may include code information for controlling the door and/or sunroof of the vehicle. For example, the control information may include a code number [001] for opening the door and/or sunroof of the vehicle 100%, a code number [002] for opening the door and/or sunroof of the vehicle 50%, and a code number [003] for opening the door and/or sunroof of the vehicle 10%. Here, if user request information with respect to the control information is not received, the controller 407 may control a vehicle door driving unit and/or a sunroof driving unit to open the door and/or sunroof of the vehicle by only 10% in order to prevent the vehicle or items within the vehicle from being stolen. The user may check the control information and transmit one of the code information (referred to as 'user request information', hereinafter) among the code number [001] for opening the door and/or sunroof of the vehicle 100%, the code number [002] for opening the door and/or sunroof of the vehicle 50%, and the code number [003] for opening the door and/or sunroof of the vehicle 10%, to control the vehicle. Other door/window opening percentages may also be used. Also, different percentages may be used for each door and/or each window of the vehicle.

Thereafter, the controller 407 determines whether or not the user request information with respect to the control information has been received from the mobile communication terminal 100 via the wireless communication network 410 (S26). For example, the controller 407 determines whether or not one of the code number [001] for opening the door and/or sunroof of the vehicle 100%, a code number [002] for opening the door and/or sunroof of the vehicle 50%, and a code number [003] for opening the door and/or sunroof of the vehicle 10% has been received.

When the user request information with respect to the control information has been received from the mobile communication terminal 100 via the wireless communication network 410, the controller 407 controls the vehicle according to the received user request information (S27). For example, when the code [001] for opening the door and/or sunroof of the vehicle 100% is received, the controller controls the vehicle door driving unit and/or the sunroof driving unit to open the door and/or sunroof of the vehicle 100%. When the code [002] for opening the door and/or sunroof of the vehicle 50% is received, the controller controls the vehicle door driving unit and/or the sunroof driving unit to open the door and/or sunroof of the vehicle 50%. When the code [003] for opening the door and/or sunroof of the vehicle 10% is received, the controller controls the vehicle door driving unit and/or the sunroof driving unit to open the door and/or sunroof of the vehicle 10%. Here, the technique of controlling the door driving unit and/or the sunroof driving unit to control the door and/or the sunroof of the vehicle is a known art, so its detailed description will be omitted.

Meanwhile, the user request information with respect to the control information is not received within a pre-set time period (e.g., one to five minutes), the controller 407 controls the vehicle according to reference control information (e.g., the door and/or sunroof of the vehicle is open 10%) among the previously determined control information (S28).

In another embodiment, a low cabin temperature (perhaps dangerous for animals or goods left in the vehicle) may be detected. Thus, the preceding method may be adapted to cause vehicle heaters to operate for a predetermined period of time or a predetermined cycle. The heater period of time or cycle may also be controllable from mobile communication terminal 100.

In another embodiment, a low or high humidity level (perhaps dangerous for animals or goods left in the vehicle) may be detected. Thus, the preceding method may be adapted to cause vehicle air conditioning to operate for a predetermined period of time or a predetermined cycle, and/or windows to open as previously described. The air conditioning and/or window operations may also be controllable from mobile communication terminal 100.

A vehicle control method according to a third exemplary embodiment of the present invention will now be described with reference to FIGS. 5, 9 and 10.

Figure 9:
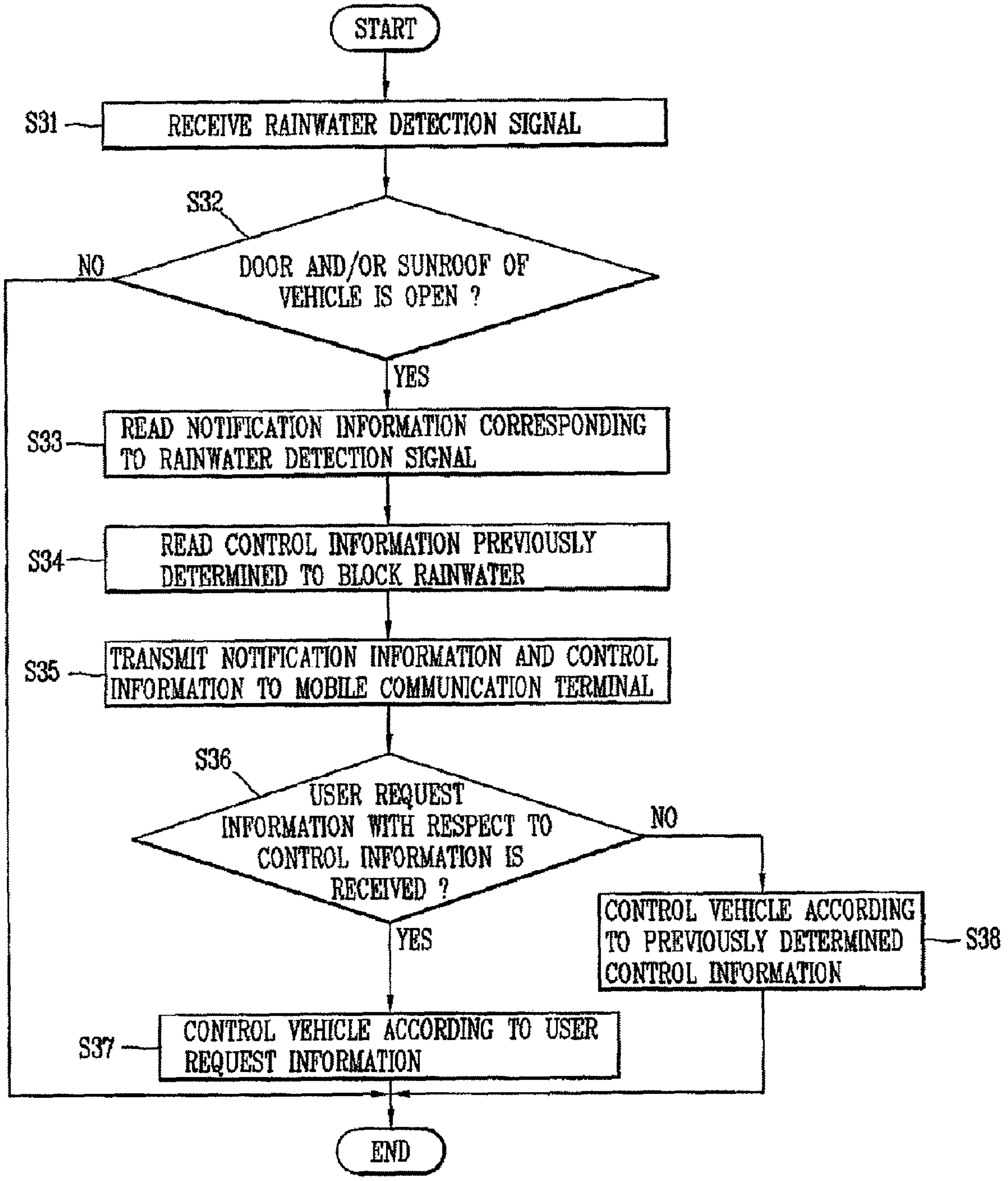
FIG. 9 is a flow chart illustrating the process of a vehicle control method according to a third exemplary embodiment of the present invention.

FIG. 9 is a flow chart illustrating the process of a vehicle control method according to a third exemplary embodiment of the present invention.

First, when the vehicle event icon of the telematics terminal is selected, the controller 407 receives a precipitation detection signal from the rain detection unit 502 mounted inside the vehicle (S31). The rain detection unit 502 may be called a precipitation detector or a precipitation detection sensor. When precipitation drops to a front windshield of the vehicle, a sensor installed at a middle portion of an upper portion at the front windshield, of the rain detection unit 502, detects the amount and speed of the rainwater, e.g., through infrared detection or another detection method. The rain detection unit 502 may also detect precipitation on another part of the vehicle in addition to or instead of the front windshield (e.g., through an open sunroof, or a cabin detector, or a rear window detector.) Here, the rain detection unit 502 may detect any type of precipitation (e.g., snow, sleet, hail) as well as rainwater.

When a precipitation detection signal is received from the rain detection unit 502, the controller 407 determines whether or not the door and/or sunroof of the vehicle is open (S32).

If the door and/or sunroof of the vehicle is open, the controller 407 reads notification information (e.g., text information of "It's raining") corresponding to the precipitation detection signal and control information (e.g., "Want to open door/sunroof of vehicle?") previously determined to block precipitation from the storage unit 404 (S33 and S34).

The controller 407 outputs the read notification information and the control information to the communication unit 408.

The communication unit 408 transmits the read notification information and the control information to the mobile communication terminal 100 via the wireless communication network 410 (S35).

Here, the communication unit 408 may form a wireless communication network with the mobile communication terminal 100 via the short-range wireless communication network such as Bluetooth™ and transmit the read notification information and the control information to the mobile communication terminal 100 therethrough, or may transmit the read notification information and the control information to the mobile communication terminal 100 via the information providing center.

Figure 10:
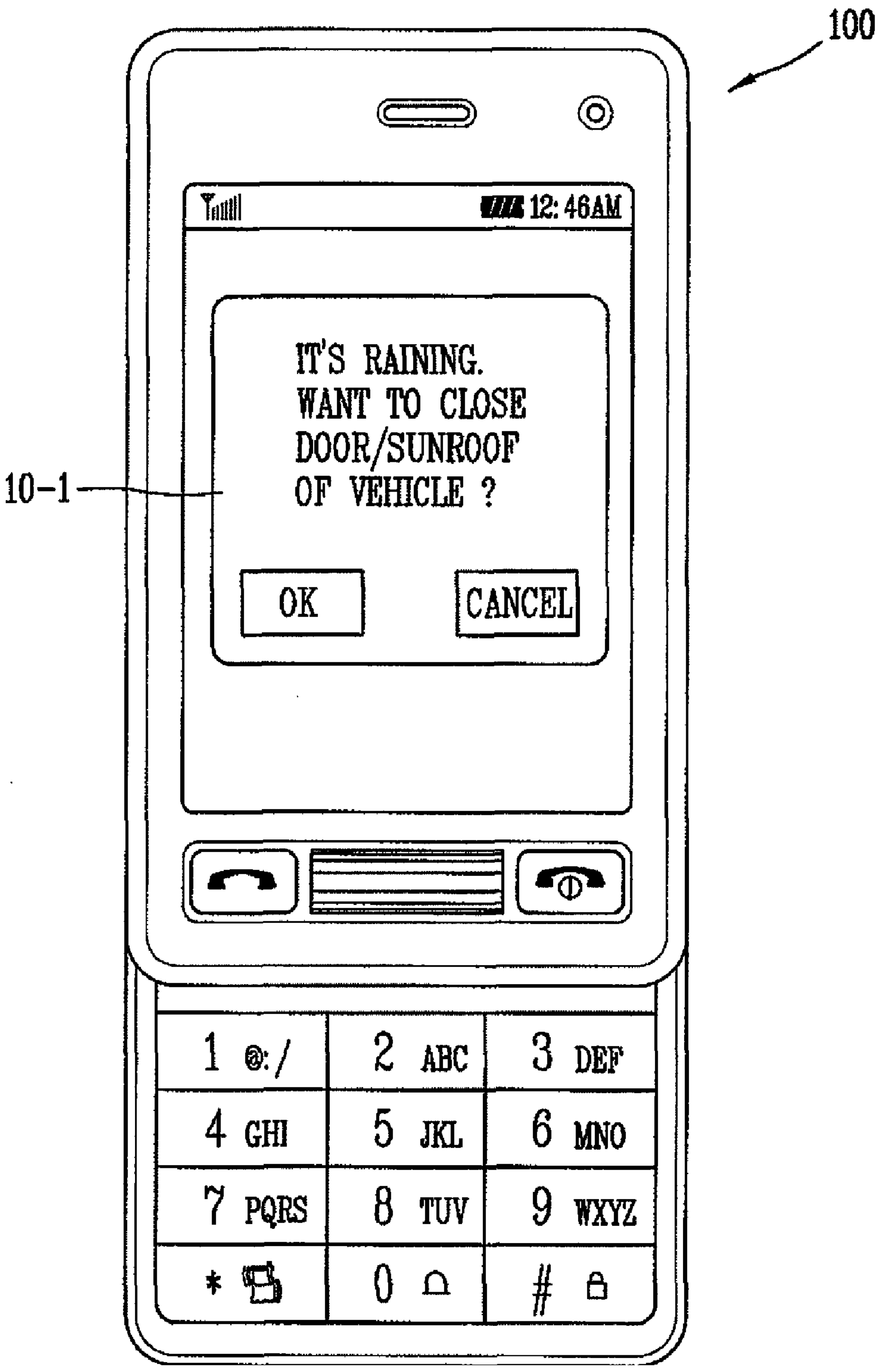
FIG. 10 illustrates notification information and control information displayed on a screen of a mobile communication terminal according to the third exemplary embodiment of the present invention.

FIG. 10 illustrates notification information and control information displayed on a screen of a mobile communication terminal according to the third exemplary embodiment of the present invention;

As shown in FIG. 10, the mobile communication terminal 100 displays the notification information (e.g., text information of "It's raining") and the control information (e.g., "Want to close door/sunroof of vehicle?") (10-1) received from the vehicle control apparatus on its screen. Here, the control information may include code information for controlling the door and/or sunroof of the vehicle. For example, the control information may include a code number [010] for shutting the door and/or sunroof of the vehicle 100%.

Here, if user request information with respect to the control information is not received, the controller 407 may control the vehicle door driving unit and/or the sunroof driving unit to shut the door and/or sunroof of the vehicle to protect the vehicle.

Thereafter, the controller 407 determines whether or not user request information with respect to the control information is received from the mobile communication terminal 100 via the wireless communication network 410 (S36). For example, the controller 407 determines whether or not the code number [010] for shutting the door and/or the sunroof of the vehicle has been received.

When user request information with respect to the control information is received from the mobile communication terminal 100 via the wireless communication network 410, the controller 407 controls the vehicle according to the received user request information (S37). For example, when the code number [010] for shutting the door and/or sunroof of the vehicle has been received, the controller 407 controls the vehicle door driving unit and/or sunroof driving unit to shut the door and/or sunroof of the vehicle 100%.

Meanwhile, if user request information with respect to the control information is not received within a pre-set time period (e.g., one to five minutes), the controller 407 controls the vehicle according to reference control information (e.g., the door and/or sunroof of the vehicle is shut 100%, other percentages may also be used.) among the previously determined control information (S38). Different percentages may be used for each window of the vehicle.

A vehicle control method according to a fourth exemplary embodiment of the present invention will now be described with reference to FIGS. 5, 11, and 12.

Figure 11:
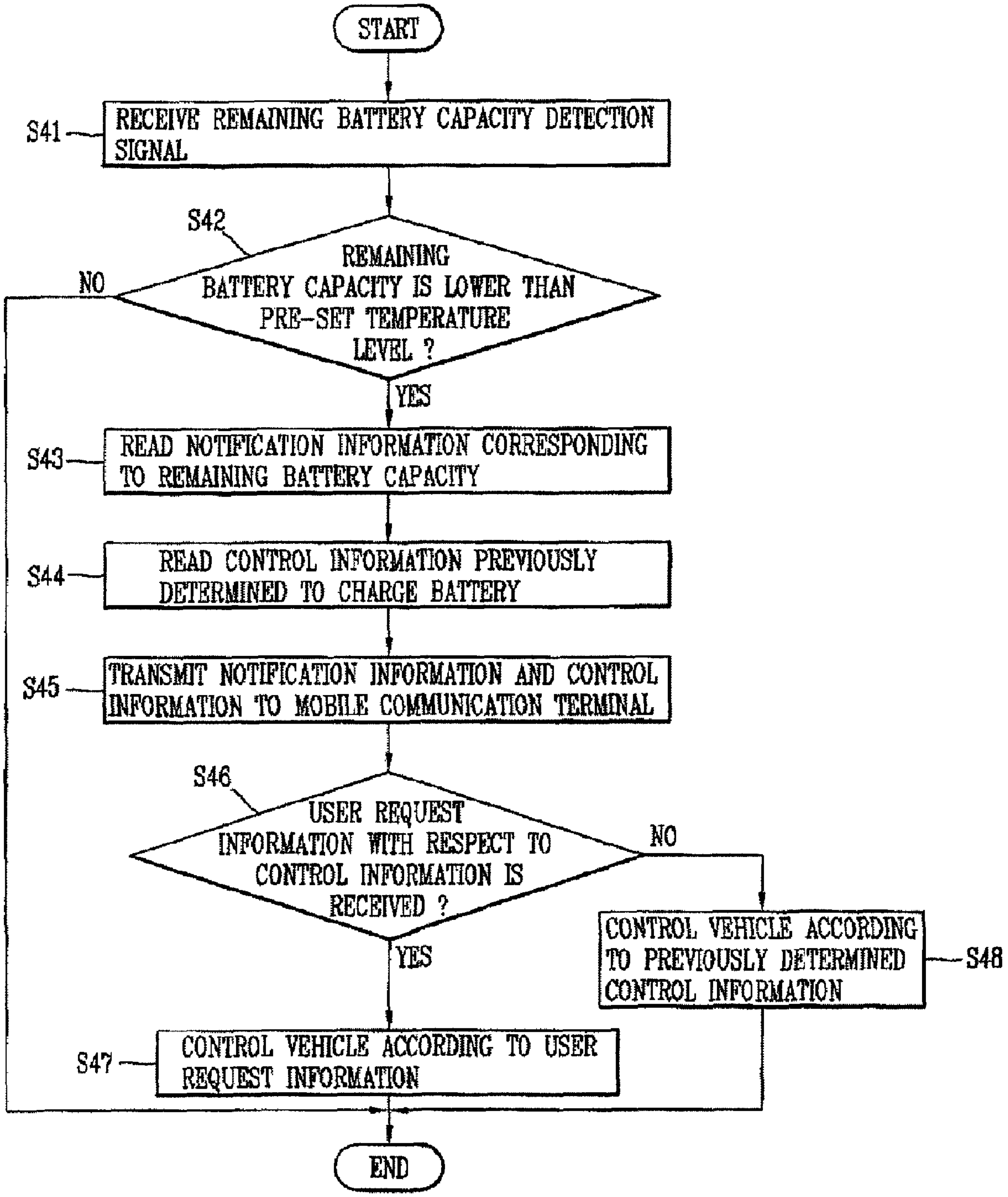
FIG. 11 is a flow chart illustrating the process of a vehicle control method according to a fourth exemplary embodiment of the present invention.

FIG. 11 is a flow chart illustrating the process of a vehicle control method according to a fourth exemplary embodiment of the present invention.

First, when the vehicle event icon of the telematics terminal is selected, the controller 407 receives a remaining battery capacity signal from the battery detection unit 503 configured to detect the remaining battery capacity of the vehicle (S41).

The controller 407 determines whether or not the remaining battery capacity corresponding to the remaining battery capacity signal is lower than a pre-set reference value (e.g., less than 10% to 20% of the total battery capacity) (S42). Here, if the vehicle is left in a state that the battery of the vehicle is insufficient, a situation in which the vehicle cannot start may occur. Thus, it is desirable to charge the battery when the remaining battery capacity of the vehicle is not sufficient.

When the remaining battery capacity is lower than the pre-set reference value (e.g., less than 10% to 20% of the total battery capacity), the controller 407 reads notification information (e.g., text information of "Battery is not sufficient") corresponding to the remaining battery capacity and control information (e.g., "Want to start vehicle for 20 minutes to charge battery?") previously determined to charge the battery from the storage unit 404 (S43 and S44).

The controller 407 outputs the read notification information and the control information to the communication unit 408.

The communication unit 408 transmits the read notification information and the control information to the mobile communication terminal 100 via the wireless communication network 410 (S45). Here, the communication unit 408 may form a wireless communication network with the mobile communication terminal 100 via the short-range wireless communication network such as Bluetooth™ and transmit the read notification information and the control information to the mobile communication terminal 100 therethrough, or may transmit the read notification information and the control information to the mobile communication terminal 100 via the information providing center.

Figure 12:
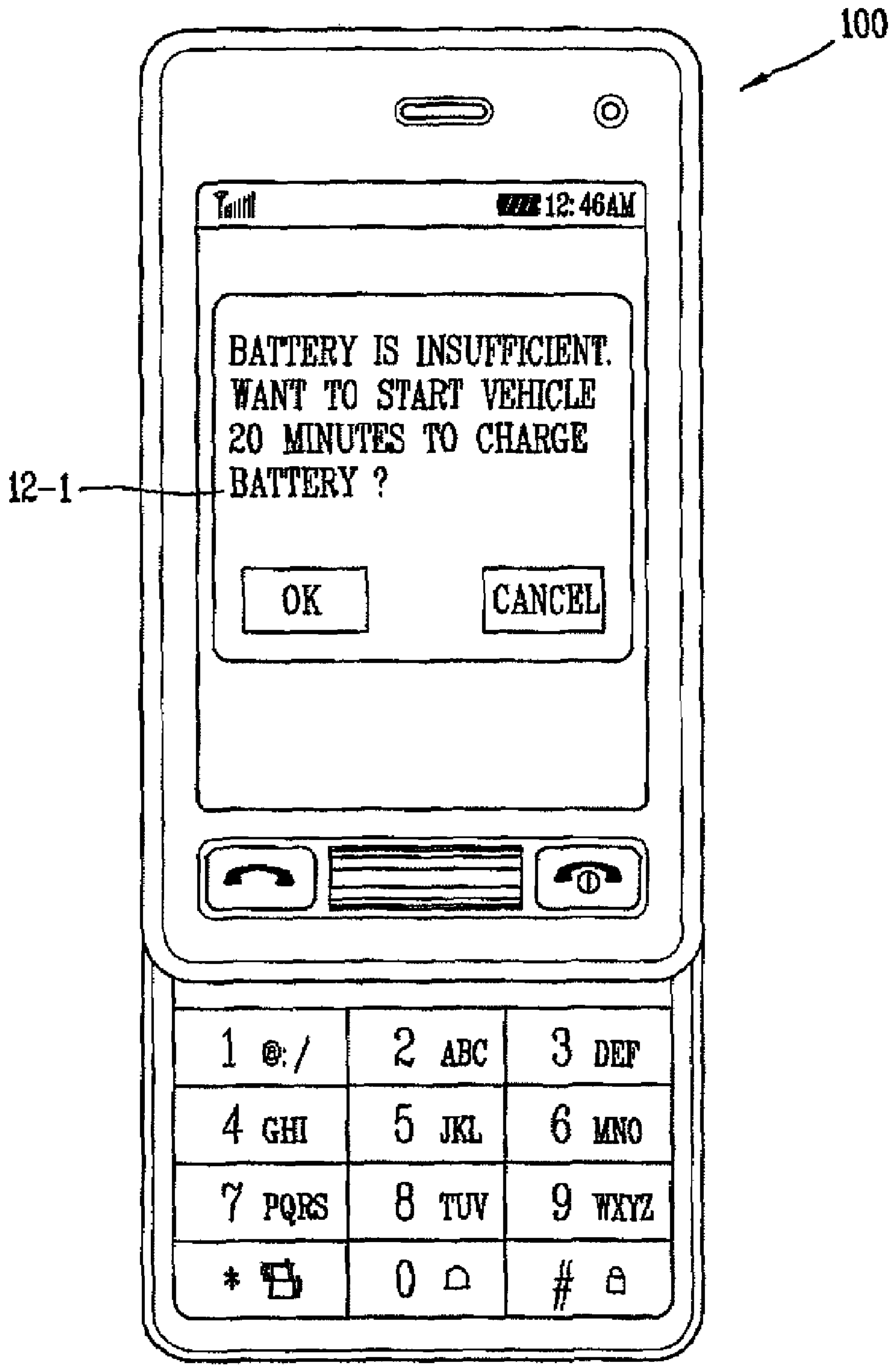
FIG. 12 illustrates notification information and control information displayed on a screen of a mobile communication terminal according to the fourth exemplary embodiment of the present invention.

FIG. 12 illustrates notification information and control information displayed on a screen of a mobile communication terminal according to the fourth exemplary embodiment of the present invention.

As shown in FIG. 12, the mobile communication terminal 100 displays the notification information (e.g., text information of "Battery is not sufficient") and the control information (e.g., "Want to start vehicle for 20 minutes to charge battery?") (12-1) received from the vehicle control apparatus on its screen. Here, the control information may include code numbers for starting the vehicle during various time periods. For example, the control information may include a code number [201] for starting the vehicle for 10 minutes, a code number [202] for starting the vehicle for 20 minutes, and a code number [203] for starting the vehicle for 30 minutes. Other charging durations are also possible. Also, intermittent charging (i.e., charge for 20 minutes, off for 10 minutes, charge for 20 minutes) may be used. Accordingly, the user may check the control information and transmit one code information (referred to as 'user request information', hereinafter) among the code number [201] for starting the vehicle for 10 minutes, the code number [202] for starting the vehicle for 20 minutes, and the code number [203] for starting the vehicle for 30 minutes to the vehicle control apparatus to control the vehicle.

Thereafter, the controller 407 determines whether or not the user request information with respect to the control information has been received from the mobile communication terminal 100 via the wireless communication network 410 (S46). Here, the controller 407 forms a wireless communication network with the mobile communication terminal 100 via the short-range wireless communication network such as Bluetooth™, and determines whether or not the user request information with respect to the control information has been received from the mobile communication terminal via the wireless communication network or determines whether or not the user request information with respect to the control information has been received from the mobile communication terminal via the information providing center.

For example, the controller 407 determines whether or not one of the code number for starting the vehicle for 10 minutes, the code number [202] for starting the vehicle for 20 minutes, and the code number [203] for starting the vehicle for 30 minutes has been received.

When the user request information with respect to the control information has been received from the mobile communication terminal 100 via the wireless communication network 410, the controller 407 controls the vehicle according to the received user request information (S47). For example, when the code number [201] for starting the vehicle for 10 minutes is received, the controller 407 controls a starting device of the vehicle to start the vehicle for 10 minutes, and then, when 10 minutes lapses, the controller 407 controls the starting device of the vehicle to turn off the starting of the vehicle. When the code number [202] for starting the vehicle for 20 minutes is received, the controller 407 controls a starting device of the vehicle to start the vehicle for 20 minutes, and then, when 20 minutes lapses, the controller 407 controls the starting device of the vehicle to turn off the starting of the vehicle.

Also, when the code number [203] for starting the vehicle for 30 minutes is received, the controller 407 controls a starting device of the vehicle to start the vehicle for 30 minutes, and then, when 30 minutes lapses, the controller 407 controls the starting device of the vehicle to turn off the starting of the vehicle. Here, the technique for controlling the starting of the vehicle by controlling the starting device of the vehicle is a known art, so its detailed description will be omitted.

Meanwhile, if the user request information with respect to the control information is not received within a pre-set time period (e.g., one to five minutes), the controller 407 controls the vehicle according to reference control information (e.g., the vehicle is started for 20 minutes) among the previously determined control information (S48). Namely, when the user request information with respect to the control information is not received for a pre-set time period (e.g., one to five minutes), the controller 407 starts the vehicle for 20 minutes and turns off the starting of the vehicle.

As so far described, the vehicle control method and apparatus according to the exemplary embodiments of the present invention have many advantages as follows.

That is, first, when a vehicle event occurs, notification information corresponding to the event and control information previously determined to respond to the event are transmitted to the mobile communication terminal of the user via the wireless communication network, thus allowing the user to quickly determine and cope with the vehicle event.

Second, when the internal temperature of the vehicle is higher than a pre-set reference value, notification information corresponding to the internal temperature of the vehicle and control information previously determined to lower the internal temperature are transmitted to the mobile communication terminal of the user via the wireless communication network, thus allowing the user to quickly determine and cope with the vehicle event.

Third, when a precipitation detection signal is detected, notification information corresponding to the precipitation detection signal and control information previously determined to block precipitation are transmitted to the mobile communication terminal of the user via the wireless communication network, thus allowing the user to quickly determine and cope with the vehicle event.

Fourth, when the remaining battery capacity of the vehicle is lower than a pre-set reference value, notification information corresponding to the remaining battery capacity and control information previously determined to charge the battery are transmitted to the mobile communication terminal of the user via the wireless communication network, thus allowing the user to quickly determine and cope with the vehicle event.

The previously described embodiments may be employed with and/or in any type of vehicle such as an automobile, truck, bus, boat, etc.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control method, comprising:

determining by an onboard vehicle device that an environmental event has occurred or is occurring to the vehicle;

transmitting, from the onboard vehicle device to a mobile communication terminal via a wireless communication network, an environmental event notification and previously determined control information for responding to the environmental event;

receiving a response at the onboard vehicle device from the mobile communication terminal, the response being one of a command for responding to the environmental event in accordance with the previously determined control information and a command for responding to the environmental event in accordance with user-specified control information;

controlling the vehicle according to the received response command; and controlling the vehicle according to the previously determined control information, if the response is not received within a predetermined time.

2. The method of claim 1, wherein the environmental event is a high cabin temperature event, and wherein the user-specified control information of the command comprises one of a plurality of code numbers for controlling a door, a window, or a sunroof of the vehicle.

3. The method of claim 1, wherein the environmental event is a low cabin temperature event, and wherein the user-specified control information of the command comprises one of a plurality of code numbers for controlling a heater of the vehicle.

4. The method of claim 1, wherein the environmental event is a precipitation event, and wherein the user-specified control information of the command comprises one of a plurality of code numbers for controlling a door, a window, or a sunroof of the vehicle.

5. The method of claim 1, wherein the environmental event is a cabin humidity event, and wherein the user-specified control information of the command comprises one of a plurality of code numbers for controlling a heater, an air conditioner, a door, a window, or a sunroof of the vehicle.

6. The method of claim 1, wherein the environmental event is a low battery level event, and wherein the user-specified control information of the command comprises one of a plurality of code numbers for controlling a charging of a battery of the vehicle.

7. An apparatus configured to be installed in a vehicle having an event detector installed therein, the apparatus comprising:

a controller operatively connected to the event detector and configured to determine that an environmental event has occurred or is occurring to the vehicle; and a communication unit operatively connected to the controller and configured to transmit, to a mobile communication terminal via a wireless communication network, an environmental event notification and previously determined control information for responding to the environmental event, and receive a response from the mobile communication terminal, the response being one of a command for responding to the environmental event in accordance with the previously control information and a command for responding to the environmental event in accordance with user-specified control information, wherein the controller is further configured to control the vehicle according to the received response command, and to control the vehicle according to the previously determined control information if the response is not received within a predetermined time.

8. The apparatus of claim 6, wherein the environmental event is a high cabin temperature event, and wherein the user-specified control information of the command comprises one of a plurality of code numbers for controlling a door, a window, or a sunroof of the vehicle.

9. The apparatus of claim 6, wherein the environmental event is a low cabin temperature event, and wherein the user-specified control information of the command comprises one of a plurality of code numbers for controlling a heater of the vehicle.

10. The apparatus of claim 6, wherein the environmental event is a precipitation event, and wherein the user-specified control information of the command comprises one of a plurality of code numbers for controlling a door, a window, or a sunroof of the vehicle.

11. The apparatus of claim 6, wherein the environmental event is a cabin humidity event, and wherein the user-specified control information of the command comprises one of a plurality of code numbers for controlling a heater, an air conditioner, a door, a window, or a sunroof of the vehicle.

12. The apparatus of claim 6, wherein the environmental event is a low battery level event, and wherein the user-specified control information of the command comprises one of a plurality of code numbers for controlling a charging of a battery of the vehicle.

13. A vehicle, comprising:

an event detector configured to transmit an event detection signal;

a controller operatively connected to the event detector and configured to determine, based on the event detection signal, that an environmental event has occurred or is occurring to the vehicle; and a communication unit operatively connected to the controller and configured to:

transmit, to a mobile communication terminal via a wireless communication network, an environmental event notification and previously determined control information for responding to the environmental event, and receive a response from the mobile communication terminal, the response being one of a command for responding to the environmental event in accordance with the previously determined control information and a command for responding to the environmental event in accordance with user-specified control information, wherein the controller is further configured to control the vehicle according to the received response command, and to control the vehicle according to the previously determined control information if the response is not received within a predetermined time.

14. The vehicle of claim 13, wherein the environmental event is a cabin temperature event, and wherein the user-specified control information of the command comprises one of a plurality of code numbers for controlling a door, a window, a sunroof, or a heater of the vehicle.

15. The vehicle of claim 13, wherein the environmental event is a precipitation event, and wherein the user-specified control information of the command comprises one of a plurality of code numbers for controlling a door, a window, or a sunroof of the vehicle.

16. The vehicle of claim 13, wherein the environmental event is a cabin humidity event, and wherein the user-specified control information of the command comprises one of a plurality of code numbers for controlling a heater, an air conditioner, a door, a window, or a sunroof of the vehicle.

17. The vehicle of claim 13, wherein the environmental event is a low battery level event, and wherein the user-specified control information of the command comprises one of a plurality of code numbers for controlling a charging of a battery of the vehicle.

18. A vehicle control method, comprising:

determining by a device within a vehicle that an environmental event has occurred or is occurring in or on the vehicle;

transmitting, from the device to a mobile communication terminal via a wireless communication network, an environmental event notification and previously determined control information for responding to the environmental event;

receiving a response from the mobile communication terminal, the response being one of a command for responding to the environmental event and a request further information; and one of controlling the vehicle according to the received command and providing the requested information, wherein if the response is not received within a predetermined time, controlling the vehicle according to the previously determined control information, and wherein the environmental event is one of a high or low temperature event, a humidity event, a precipitation event, and a low battery event.

19. An apparatus configured to be installed in a vehicle having an event detector installed therein, the apparatus comprising:

a controller operatively connected to the event detector and configured to determine that an environmental event has occurred or is occurring in or on the vehicle; and a communication unit operatively connected to the controller and configured to transmit, to a mobile communication terminal via a wireless communication network, an environmental event notification and previously determined control information for responding to the environmental event, and receive a response from the mobile communication terminal, the response being one of a command for responding to the environmental event and a request for further information, wherein the controller is further configured to control the vehicle according to the received command and provide the requested information, wherein if the response is not received within a predetermined time, controlling the vehicle according to the previously determined control information, and wherein the environmental event is one of a high or low temperature event, a humidity event, a precipitation event, and a low battery event.

20. The method of claim 1, wherein controlling the vehicle comprises starting the vehicle for a predetermined time based on a battery capacity of the vehicle.

21. The apparatus of claim 6, wherein the controller is configured to start the vehicle for a predetermined time based on a battery capacity of the vehicle.

* * * * *